United States Patent [19]
Hurter et al.

[11] 3,877,507
[45] Apr. 15, 1975

[54] AUTOMATIC CASTING APPARATUS

[75] Inventors: Fritz Hurter; Hans Hollenstein, both of Schaffhausen, Switzerland

[73] Assignee: Georg Fischer Aktiengesellschaft, Schaffhausen, Germany

[22] Filed: Feb. 26, 1974

[21] Appl. No.: 446,013

[30] Foreign Application Priority Data
Mar. 6, 1973 Switzerland.......................... 3247/73

[52] U.S. Cl. .................. 164/155; 164/337; 222/56; 222/77
[51] Int. Cl. ........................................... B22d 39/00
[58] Field of Search ........... 164/154, 155, 336, 337; 222/56, 77, 166, DIG. 12, DIG. 15

[56] References Cited
UNITED STATES PATENTS
366,340   7/1887   Morgan............................ 164/336 X
2,892,225   6/1959   Buhrer et al........................ 222/166

*Primary Examiner*—Robert D. Baldwin
*Attorney, Agent, or Firm*—Toren, McGeady and Stanger

[57] ABSTRACT

Automatic casting apparatus wherein a measured quantity of molten casting material may be provided in casting molds by operation of a weighing mechanism which controls dispensing of the casting material from a stopper ladle into a casting ladle. The invention is particularly directed to an improved weighing mechanism which operates in association with a tipping mechanism for the casting ladle which is pivotally mounted upon a pair of balance beams extending from the weighing mechanism. Measuring elements are located within the weighing mechanism and control elements operatively associated with the weighing mechanism determine dispensing of a measured quantity of molten material from the stopper ladle into the casting ladle.

9 Claims, 5 Drawing Figures

AUTOMATIC CASTING APPARATUS

BACKGROUND OF THE INVENTION

The present invention relates to automatic casting equipment particularly suitable for use in connection with casting molds which are serially arranged along a casting line. More particularly, the invention relates to apparatus including a weighing mechanism and having a casting ladle attached to the weighing mechanism with a stopper ladle arranged above the casting ladle in a position to dispense a measured amount of liquid metal necessary for each mold. The amount of metal dispensed is determined by the weighing mechanism and a tipping device is provided in operative association with the casting ladle.

The present invention is intended as an improvement over a known prior art arrangement, such as that disclosed in Swiss Pat. No. 320,832, wherein a scale arranged separately from a casting ladle and its tipping and holding device determines the quantity of liquid metal which is fed from a stopper ladle to the casting ladle in the casting of a mold. In this known arrangement, the scale is stationary and arranged beneath the discharge opening of the stopper ladle along the casting line of the apparatus. In an arrangement of this type, the scale is disposed to contamination and damage and is susceptible to having liquid metal splashed thereupon. Metal splashes can be caused either by operation of the casting apparatus or as a result of dripping from the stopper of the stopper ladle. It will be apparent that such occurrences will have serious adverse effects upon the results of the measuring operation which must be accomplished by the device.

An additional drawback of such prior art devices involves the fact that the casting ladle must be moved for exact positioning above the scale during the filling operation and must then be lifted from the scale out of the bearings of the tipping device so that it can be filled with the liquid metal. After filling, the casting ladle must be lowered onto the bearings of the tipping device and moved laterally to effect the casting operation. Such movement requires relatively complicated equipment and correspondingly complicated maintenance procedures.

SUMMARY OF THE INVENTION

The present invention is directed to a mechanism for overcoming the problems involved in casting equipment of the type previously described and to providing a compact form of casting apparatus involving casting molds arranged in a serially oriented path along a casting line wherein a weighing device and a casting ladle attached thereto operate in association with a tipping device for the casting ladle. In the present invention, the ratio of the weight of the liquid melt which is to be poured into the casting ladle relative to the dead weight of the casting ladle, including parts of the weighing mechanism involved in the weighing operation, is maintained relatively low to ensure that the weight of the filled-in molten metal can be maintained at an exact level by the weighing operation. In order to reduce as much as possible the maintenance problems involved with the weighing mechanism, it is advantageous to maintain the weighing mechanism in an enclosed state and to isolate the bearings of the weighing mechanism to render them as insensitive as possible to outside disturbances which could affect the accuracy of the measurements to be taken. Furthermore, it is advantageous to design the weighing mechanism in a manner enabling it to be located outside of the pouring zone of the casting ladle.

The invention provides a device for holding the casting vessel by means of which the casting vessel may be arranged to be located a short distance beneath the stopper ladle. the tipping device which operates to tip the casting ladle must also be designed so that the positioning of the casting ladle in the vertical direction is not changed during the tipping operation. This has the effect of enabling the molten metal to be cast immediately after the conclusion of the weighing operation in order to prevent as much as possible cooling of the liquid during an interim period.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
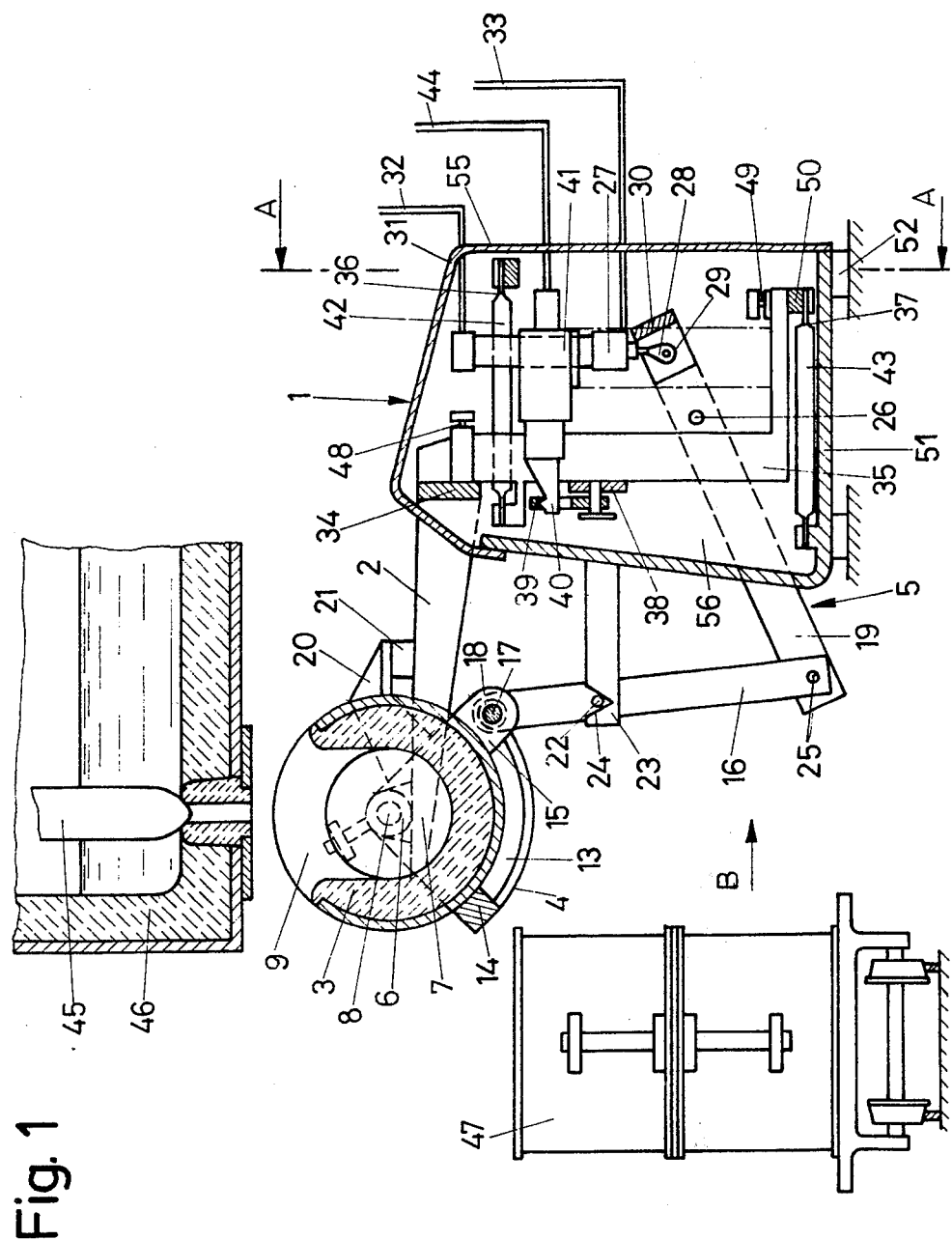
FIG. 1 is a sectional elevation of a mechanism according to the present invention, taken along a plane which extends transversely to the casting line of the apparatus.
Figure 3:
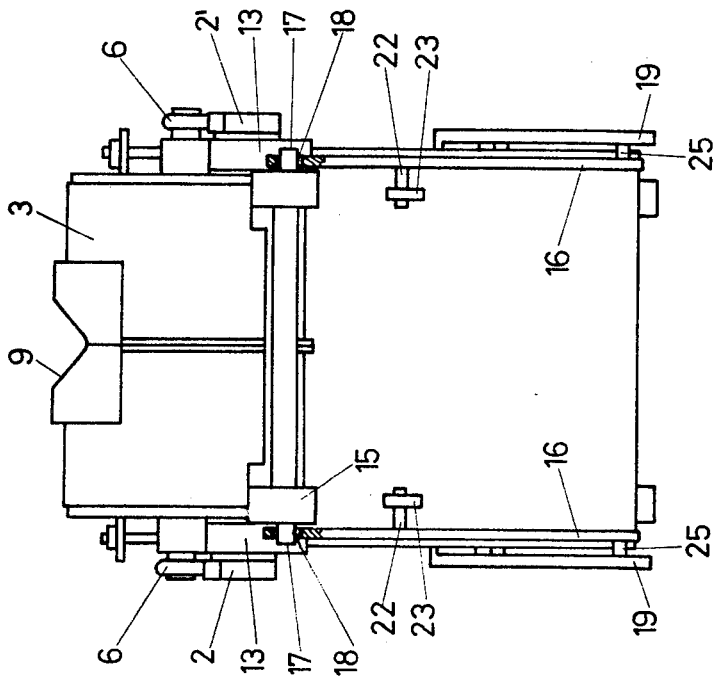
FIG. 3 is a front elevation of the device of FIG. 1 as viewed in the direction of the arrow B.
Figure 2:
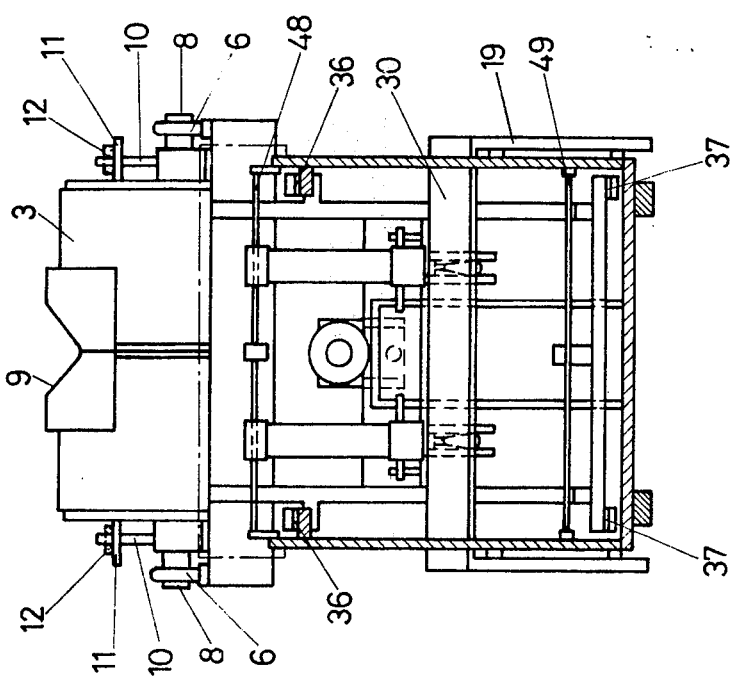
FIG. 2 is a sectional view taken along the line A—A of FIG. 1.

Referring now to the drawings, wherein like reference numerals refer to similar elements throughout the various Figures thereof, and referring particularly to FIGS. 1, 2 and 3, a weighing mechanism 1 having a pair of balance beams 2,2' is shown with a pivot bearing 6 attached at each of the load ends 7 of the balance beams 2,2'. The pivot bearings 6 each operate to receive a pivot 8 of a receiving device 4 for a casting ladle 3. The receiving device 4 is formed with side plates 13 which receive the pivots 8 and with segmented crossbeams 14,15 carrying the casting ladle 3 and connecting the side plates 13. On each of the side plates 13 there is arranged a stop 20 which may be located to bear upon a support member 21 attached upon each of the balance beams 2,2'. A bolt 10 arranged in a collar of the pivots 8 engages a bore of a lug 11 provided on the casting ladle 3, with a pin 12 extending through the bolt 10 above the lug 11 to prevent the casting ladle from being accidentally lifted out of the receiving device 4. The stop members 20 bearing against the support 21 and the bolts 10 engaging the lugs 11 operate to maintain the casting level fixed in position with its filling and casting opening pointing upwardly.

The crossbeam 15 is provided at both ends thereof with journals 17. A pair of operating levers 16 each include a bore 18 with the journals 17 extending in engagement therewith to form a joint. The diameters of the bores 18 of the operating levers 16 are dimensioned to be larger by a specific amount than the diameters of the journals 17. A stop pin 20 fixed upon the operating levers 16 engages a recess 24 of a locking plate 23 during lowering of the operating lever 16. When the casting vessel 3 is in position for weighing and filling, with the stop member 20 bearing against the support 21 and with the pin 22 engaged within the recess 24, a certain amount of play is established between the journals 17 and the bores 18 so that the receiving device 4 may be separated from a tipping device 5.

The tipping device 5 is comprised of the operating levers 16 and operating levers 19 as well as pneumatically or hydraulically operated cylinders 27. The operating levers 16 and 19 are pivotally connected at their ends by means of a bolt 25. The opposite end of the operating lever 19 is formed in a forked configuration and is pivotally joined to a housing 31 of the weighing mechanism 1 by means of journals 26. The lever 19 includes a cross member 30 having arranged thereon berings for piston rod bolts 29 which receive a connecting part of a piston rod 28 of cylinders 27. Preferably, two synchronously operating cylinders 27 are provided, with cylinders 27 being mounted upon the housing 31 and being provided with a control system (not shown) whereby the cylinders 27 may be actuated by means of control lines 32.

A pair of parallel angle levers 35 are joined together with the pair of balance beams 2,2' to form a unitary assembly by means of a cross strut 34. A measuring beam 39 is mounted upon a plate 38 connecting the angle levers 35 with the beam 39 bearing upon the knife edge of a measuring mandrel 40 of a measuring element 41 which is preferably comprised of a bending pressure cell and which is fixed upon the housing 31.

The angle levers 35 are movably held in an upper plane 42 and in a lower plane 43 by means of parallel spring elements 36 and 37. One end of the spring elements 36 and 37 is connected to the housing 31 and the other end thereof is connected to the angle levers 35. The connection of the upper spring element 36 with the housing 31 is provided at the rear wall 55 of the housing, and the connection of the lower spring element 37 is provided on the front wall 56 so that by this arrangement there is obtained a guiding effect of the angle levers 35 in the manner of a parallelogram. As a result of this action, the spring elements 36 and 37 are only subjected to stresses in bending and tension. A control line transmitting and measuring pulses of the measuring element 41 extends to a central control system (not shown) which controls, for example, the operating mechanism for a stopper 45 of a stopper ladle 46, the stopper ladle 46 operating to perform the function of a storage ladle.

Provided in the range of the upper plane 42 is at least one flexible stabilizing element 48 which is connected at a region in the center thereof to the cross strut 34, with the ends of the stabilizing element 48 being connected to the side walls of the housing 31. Similarly, in the range of the lower plane 43 there is provided at least one flexible stabilizing element 49, which is also connected at its center region to the cross strut 50 with the ends of the element 49 being connected to the side walls of the housing 31. The stabilizing elements 48 and 49 provide lateral stabilization for the angle levers 35. The elements 48 and 49 generally comprise elongated rods having a round cross section. However, the elements 48 and 49 may be formed to have cross sections of other geometrical configuration, for example, they may be formed with a polygonal cross section.

Figure 4:
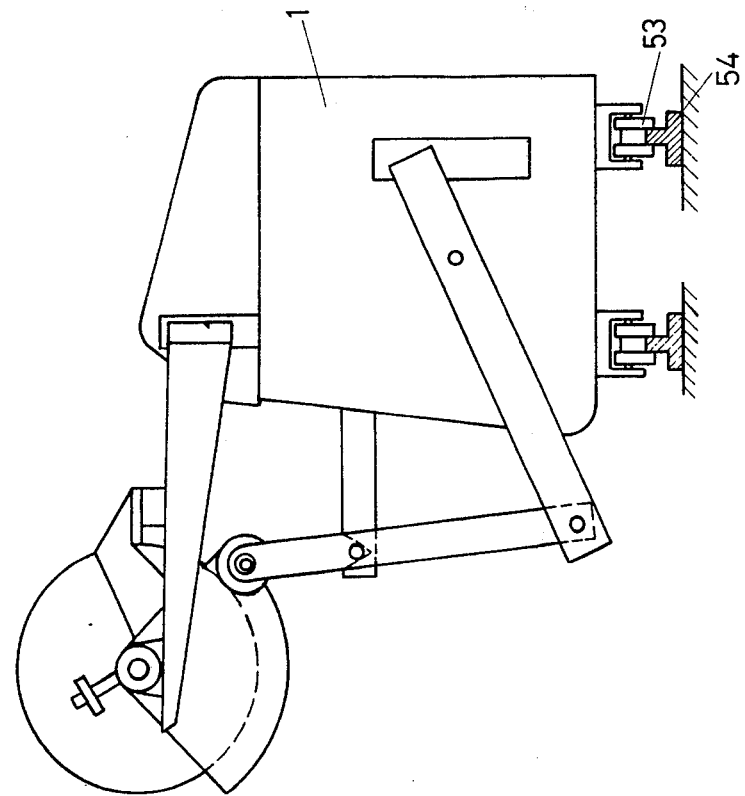
FIG. 4 is a side elevation of an alternative embodiment of the weighing machine of the present invention shown as movable along a casting line.

Plates 52 provided on a bottom member 51 operate to secure the housing 31 on a base. However, as shown in FIG. 4, rollers 53 may be used in place of the plates 52, with the rollers 53 operating to engage rails 54 whereby the weighing mechanism 1 may be movably supported. In order to effect displacement of the weighing mechanism 1, a variety of known means within the knowledge of those skilled in the art may be freely selected. A casting line which extends laterally of the casting ladle 3 is shown with casting molds 47 being provided.

Figure 5:
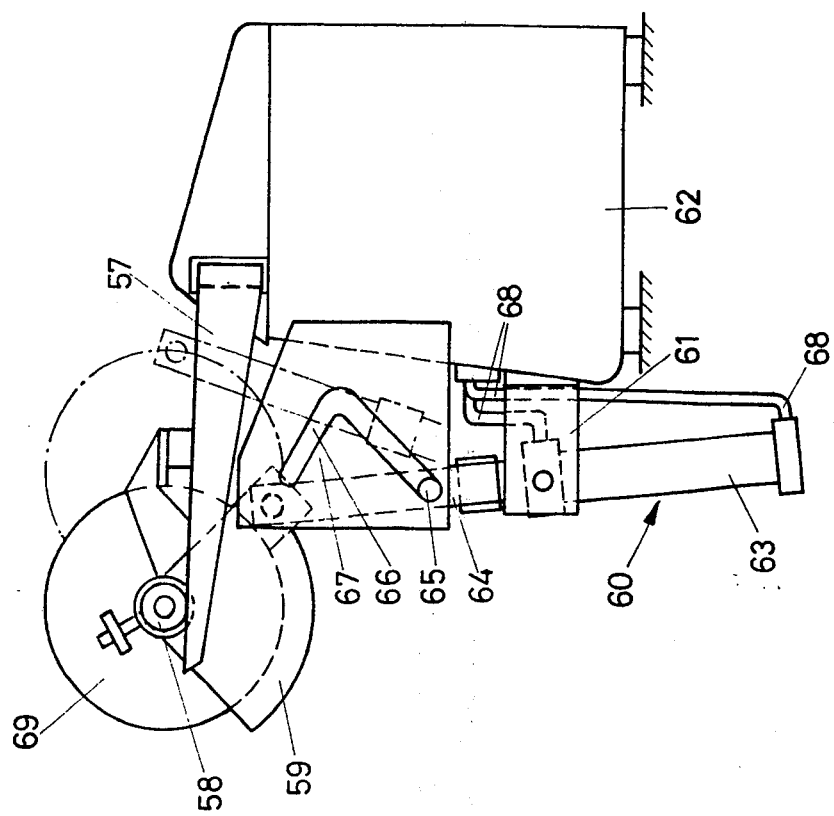
FIG. 5 is a side elevation depicting another embodiment of the present invention comprising a device for effecting controlled pouring of the melt into a casting ladle.

FIG. 5 depicts another embodiment of the present invention wherein, instead of the pivot bearings 6 shown in FIG. 1, a roll body 58 is provided on each pair of the balance beams 57,57', with the roll bodies 58 being guided by the pair of balance beams 57,57'. Inserted in the roll bodies 58 is a receiving device 59 which is similar to the receiving device shown in FIG. 1. The receiving device 59 is laterally connected to a tipping device 60 which is arranged on a weighing mechanism 62 by means of a bracket 61 which enables appropriate movement of the tipping device 60. The weighing mechanism 62 comprises parts similar to those described in FIGS. 1, 2, 3 and 4. The tipping device 60 includes a cylinder 63 movable on a bracket 61 with a piston 64 being pivotally connected to the receiving device 59. Attached to the piston 64 is a guide pin 65 which engages a curved slideway 66 of at least one plate 67 which is detachably mounted on the side of the weighing mechanism 62. Connected to the cylinder 63 are control lines 68 which are, in turn, connected to a central control system (not shown).

In the operation of the device, when the cylinder 63 is actuated and when the piston rod 64 of the casting ladle 69 inserted in the receiving device 59 consequently receives a tipping movement simultaneously with a longitudinal movement along the pair of balance beams 57,57', a predetermined direction is imparted to a casting jet issuing from the casting ladle 69 in a manner whereby the casting jet will always impinge upon the casting ladle at the same point during the casting operation.

The present invention will provide several advantages, particularly due to the fact that the overall arrangement herein disclosed is relatively compact, thereby enabling it to be used and applied in a versatile manner. The arrangement involves an enclosed structure which is practically meintenance-free and which is capable of operation in applications where other previously known arrangements can not be effectively utilized.

Additionally, the present invention permits weighing measurements to be taken with great accuracy within small tolerances. This accuracy is made possible by the favorable ratio between the weight of liquid melt poured into the ladle and the dead weight of the casting ladle, including parts of the weighing machine involved in the weighing, which is enabled by the present invention. Furthermore, the arrangement permits casting of different amounts of casting material with a given setting of the control unit. The movability of the device along the casting line, as represented in FIG. 4, permits substantially continuous casting to be easily performed.

Although the casting ladle is arranged only at a small distance beneath the stopper ladle to avoid splashing of the liquid melt during pouring, the simple design of the receiving device permits rapid exchange of casting ladles, thereby enhancing the flexibility of the device.

While specific embodiments of the invention have been shown and described in detail to illustrate the application of the inventive principles, it will be understood that the invention may be embodied otherwise without departing from such principles.

We claim:

1. In an automatic casting apparatus, including casting molds serially arranged along a casting line, a weighing mechanism, a casting ladle operatively associated with said weighing mechanism, a stopper ladle arranged above said casting ladle for dispensing into said casting ladle a quantity of molten casting material determined by said weighing mechanism, and a tipping mechanism for said casting ladle, the improvement wherein said weighing mechanism comprises, in combination, a housing, a pair of balance beams having a load end, a pivotal receiving device located at the load end of said balance beams and having said casting ladle detachably supported thereon, an operating lever for said tipping device having said receiving device movably connected therewith, fixed recess means located to supportively engage said operating lever of said tipping device when said casting ladle is in position for filling by said stopper ladle and weighing by said weighing mechanism, a pair of angle levers provided on said pair of balance beams, a fixed measuring element, a measuring beam secured on said pair of angle levers operatively connecting said pair of angle levers with said fixed measuring element, a pair of spring elements each connected between said housing and one of said pair of angle levers for movably supporting said angle levers, and at least one flexible stabilizing element for providing lateral stabilization for said pair of angle levers, said stabilizing element having a centrally located region secured upon said pair of angle levers and being secured at its ends to said housing.

2. Apparatus according to claim 1, wherein said pair of spring elements are leaf springs.

3. Apparatus according to claim 1, wherein said flexible stabilizing elements are formed as elongated rods having a circular cross sectional configuration.

4. Apparatus according to claim 3, wherein said stabilizing rods have a polygonal cross sectional configuration.

5. Apparatus according to claim 1, wherein said spring elements are mounted in said weighing mechanism in a manner whereby said spring elements are subjected only to tension and bending forces.

6. Apparatus according to claim 1, wherein said weighing mechanism is constructed together with said tipping mechanism as a unitary assembly which is arranged at a stationary position relative to said casting line.

7. Apparatus according to claim 1, wherein said weighing mechanism is constructed together with said tipping mechanism as a unitary assembly which is arranged to be movable along said casting line.

8. Apparatus according to claim 1, wherein said pivotal receiving device supporting said casting ladle on said balancing beams includes pivot bearings which are coaxially secured on said balance beams.

9. Apparatus according to claim 1, wherein said pivotal receiving device includes a pivot bearing enabling pivotal movement of said device about said balance beams, with means being provided to enable longitudinal movement of said receiving device along said balance beams.

* * * * *